Figure 1:
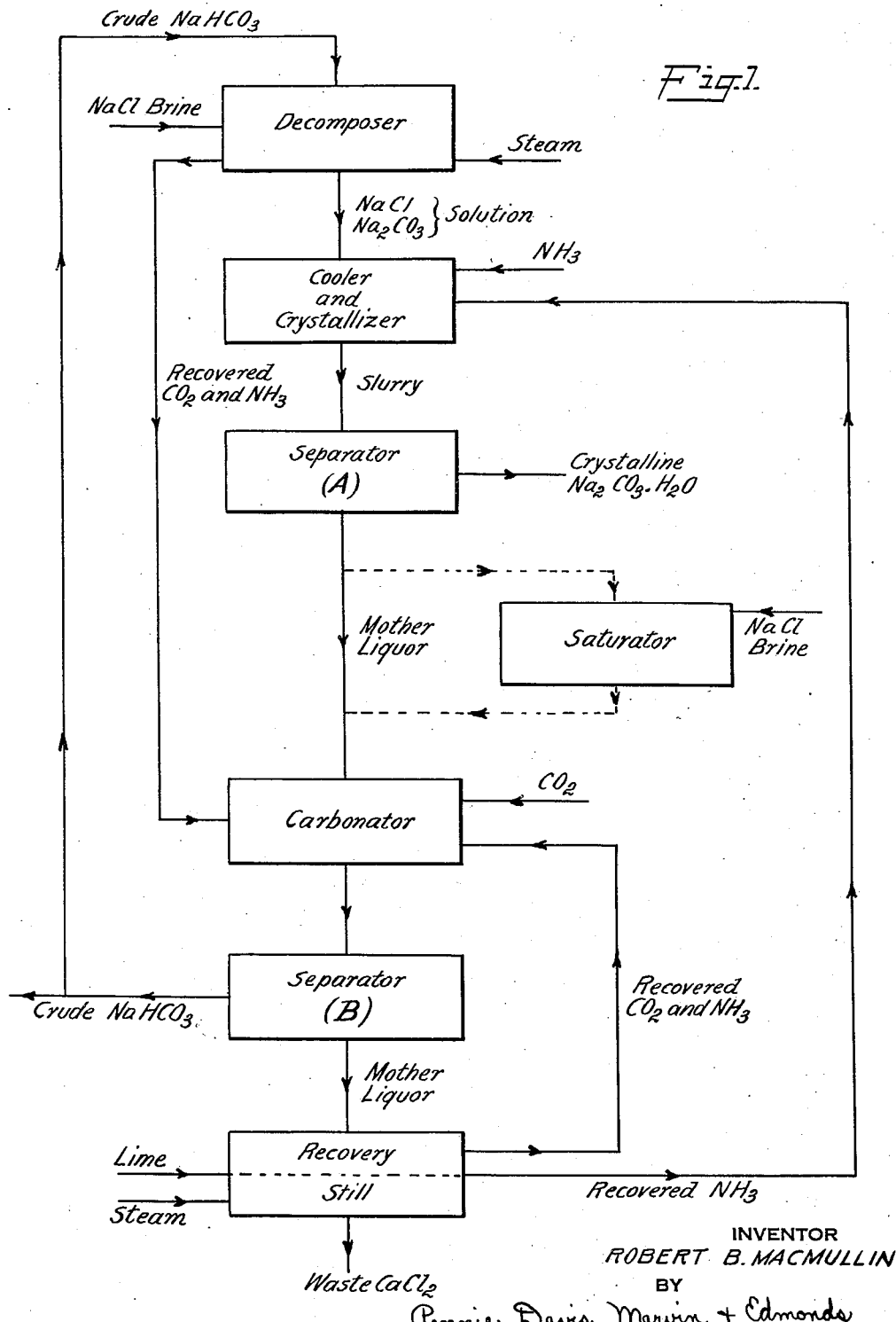

June 14, 1938.    R. B. MacMULLIN    2,120,287
PRODUCTION OF SODIUM CARBONATE MONOHYDRATE
Filed June 15, 1935    2 Sheets-Sheet 2

INVENTOR
ROBERT B. MACMULLIN
BY
Pennie, Davis, Marvin + Edmonds
ATTORNEYS

Patented June 14, 1938

2,120,287

UNITED STATES PATENT OFFICE 2,120,287

PRODUCTION OF SODIUM CARBONATE MONOHYDRATE

Robert Burns MacMullin, Niagara Falls, N. Y., assignor to The Mathieson Alkali Works, Inc., New York, N. Y., a corporation of Virginia Application June 15, 1935, Serial No. 26,711

11 Claims. (Cl. 23—63)

This invention relates to improvements in the manufacture of sodium carbonate monohydrate, $Na_2CO_3.H_2O$. More particularly, the invention relates to improvements in the conversion of sodium bicarbonate, $NaHCO_3$, to sodium carbonate monohydrate. The invention is applicable both to pure sodium bicarbonate and to crude sodium bicarbonates such as ammonia soda. The invention includes improvements in the conversion itself, in operations combining the conversion with the ammonia soda process and in a cyclic operation embodying the conversion.

The conventional methods of manufacturing sodium carbonate monohydrate require, as the essential raw material, anhydrous sodium carbonate. Anhydrous sodium carbonate, or soda ash, is conventionally produced by calcination of crude ammonia soda, an operation involving substantial expense and several difficulties. These conventional methods of manufacturing sodium carbonate monohydrate include hydration of anhydrous sodium carbonate with a limited proportion of water, at elevated temperatures, crystallization from a solution containing sodium carbonate by evaporation at temperatures above 36° C., and addition of anhydrous sodium carbonate to a solution saturated with respect to sodium carbonate at temperatures above 36° C.

This application is in part a continuation of my prior application Serial No. 601,144, filed March 25, 1932 (United States Letters Patent No. 2,005,868, dated June 25, 1935.)

In my prior application I have described an improved process for manufacturing crystalline sodium carbonate monohydrate comprising the decomposition of an aqueous solution containing sodium bicarbonate with steam to form a solution containing sodium carbonate and the precipitation of sodium carbonate monohydrate from this solution by the addition of ammonia. According to the process there described sodium carbonate monohydrate thus precipitated is separated from the mother liquor, sodium chloride is added to the mother liquor and the resulting brine carbonated to precipitate sodium bicarbonate. Precipitated sodium bicarbonate is supplied to the above mentioned decomposition in a repetition of the operation. The process of my prior application also makes provision for the recovery of carbon dioxide and ammonia from the mother liquor from which sodium bicarbonate is separated, recovered carbon dioxide being advantageously supplied to the carbonation step while recovered ammonia is advantageously utilized in the precipitation of sodium carbonate monohydrate. The present invention relates to improvements in the process described in my said prior application.

While the process described in my said prior application is advantageous and economical and enables one to recover high yields of sodium carbonate monohydrate, I have discovered that, if an aqueous sodium chloride solution containing sodium bicarbonate be decomposed with steam to form an aqueous sodium chloride solution containing sodium carbonate and ammonia be added to the solution resulting from this decomposition, sodium carbonate monohydrate will be precipitated in greater amount than if these steps are carried out in the absence of the sodium chloride. The process of my invention permits improved efficiencies and economies as will more fully appear hereinafter. The invention is of especial advantage in operations combining the conversion with the ammonia soda process.

Ammonia may be added either as a gas, as a liquid, or as an aqueous solution. By proper choice of proportions and temperatures, high recoveries of sodium carbonate monohydrate can be obtained. By such addition of ammonia sodium carbonate monohydrate can be precipitated from aqueous sodium chloride brines saturated with respect to other carbonates of sodium, sodium bicarbonate and sodium sesquicarbonate, $Na_2CO_3.NaHCO_3.2H_2O$, for example. The addition of ammonia to aqueous sodium chloride solutions saturated with respect to sodium carbonate, decahydrate, $Na_2CO_3.10H_2O$ and sodium carbonate, heptahydrate, $Na_2CO_3.7H_2O$ renders such solutions unsaturated with respect to these carbonates. The addition of ammonia to aqueous sodium chloride solutions saturated with respect to sodium carbonate monohydrate, $Na_2CO_3.H_2O$ also renders such solutions unsaturated with respect to this carbonate initially but as addition of ammonia is continued the solution again becomes saturated with respect to sodium carbonate monohydrate and with further addition of ammonia this salt, the monohydrate, is precipitated.

According to my invention, an aqueous sodium chloride solution containing sodium bicarbonate is converted to a saline solution containing sodium carbonate, advantageously, by decomposition with steam, and sodium carbonate monohydrate is precipitated from this solution by the addition of ammonia, in proportion less than that precipitating sodium carbamate. The steam for decomposition may be formed from the solution itself by the application of heat. In carrying out the invention sodium bicarbonate may be added to an aqueous solution of sodium chloride or sodium chloride, in solid or solution form, may be added to an aqueous solution of sodium bicarbonate. The present invention, as noted, permits the use of sodium chloride as solid salt or as a salt brine. The use of a salt brine for decomposing sodium bicarbonate is particularly advantageous. Since solid salt is not essential, my invention, in this aspect, is particularly advantageous in locations where salt brines, but not solid sodium chloride, are locally available.

The invention will be further described in connection with the following examples of embodiments of the invention:

*Example I.*—97.6 parts of crude ammonia soda containing 84 parts of sodium bicarbonate are added to 225 parts (by weight) of a saturated sodium chloride solution and the resulting mixture is decomposed with steam. Carbon dioxide is liberated by the decomposition and a slurry consisting largely of solid sodium sesquicarbonate and sodium chloride solution is formed. The mixture is cooled somewhat and 54 parts of ammonia are caused to be absorbed. All the sodium sesquicarbonate is decomposed. Sodium carbonate monohydrate precipitated by the addition of ammonia is separated from the mother liquor and the recovered crystals washed free of sodium chloride. About 85% of the sodium oxide content, $Na_2O$, of the original crude ammonia soda is recovered as crystalline sodium carbonate monohydrate.

The addition of the ammonia may be carried out at temperatures above or below about 50° C.; at higher temperatures the addition is carried out under superatmospheric pressure and at lower temperatures cooling is usually required. Since the solubility of sodium carbonate monohydrate varies but slightly with temperature, the temperature of separation of the precipitated sodium carbonate monohydrate is not important. The separation may be effected, for example, at temperatures of from 15° to 100° C. The precipitated crystalline sodium carbonate monohydrate is separated from the mother liquor in any convenient manner, by filtering or by centrifuging, for example.

*Example II.*—2360 parts (by weight) of crude wet sodium bicarbonate containing 1481 parts of sodium bicarbonate were added to 925 parts of NaCl in the form of salt brine and the resulting mixture was decomposed with steam. The resultant solution contained 5675 parts of $H_2O$. An analysis showed that this solution contained 26.10 grams of $Na_2CO_3$, 16.30 grams of NaCl and 0.00 grams of $NH_3$ per 100 grams $H_2O$. The solution was cooled to 30° C. and 2347 parts of $NH_3$ added while maintaining the temperature at 30° C. After the addition of $NH_3$ an analysis showed that the resulting solution contained 0.48 grams $Na_2CO_3$, 17.00 grams of NaCl and 41.35 grams of $NH_3$ per 100 grams of $H_2O$. Following the addition of $NH_3$ the solution was cooled to 26° C. The entire operation was carried out at atmospheric pressure. A yield of 98.15% of the sodium oxide content, $Na_2O$, of the crude sodium bicarbonate was recovered in the form of $Na_2CO_3.H_2O$ by filtering. The crystals obtained were coarse and granular and well adapted for the manufacture of anhydrous dense sodium carbonate.

In the operations of the foregoing examples, the decomposition of the aqueous sodium chloride solution containing sodium bicarbonate should be carried out at least far enough to convert about 65% of the bicarbonate to carbonate. The amount of ammonia that may be employed in the operation of the invention is subject to considerable variation. Ammonia may be added in proportions up to 50 parts by weight $NH_3$ to 100 parts by weight $H_2O$. Advantageously, ammonia is added in proportions of about 30-40 parts by weight $NH_3$ to 100 parts by weight $H_2O$. Ammonia may be added in greater proportions than those indicated but as the yield is already high when the proportions indicated are used, further addition of ammonia is not recommended.

It will be understood that individual operations such as those illustrated in the foregoing examples can be embodied in various composite operations for the production of sodium carbonate monohydrate. I have developed two particularly advantageous combined operations. These two operations will be further described in connection with the accompanying drawings, which illustrate, as flow sheets, these two operations.

*Operation 1*

Crude ammonia soda is dissolved in a hot aqueous sodium chloride brine and this solution is decomposed with steam, as described in Examples I and II, for example. The carbon dioxide and any ammonia recovered in this decomposition is supplied to the ammonia soda process carbonation for the precipitation of sodium bicarbonate. The carbonate solution from the decomposition is cooled to 50° C., for example, and ammonia gas is added to precipitate sodium carbonate monohydrate. This ammonia gas is advantageously that recovered in the recovery still of the ammonia soda process, following the addition of lime to the mother liquor remaining after the separation of the sodium bicarbonate, that is, this ammonia gas is advantageously substantially free from carbon dioxide. The crystallized sodium carbonate monohydrate is separated from the mother liquor which consists of an aqueous sodium chloride brine poor in sodium carbonate content but rich in ammonia. This mother liquor from which the sodium carbonate monohydrate has been separated may be carbonated directly in the ammonia-soda process to precipitate sodium bicarbonate, but, generally, it is advantageous to add NaCl until the most advantageous ratio of $NH_3$ to NaCl is obtained. Advantageously NaCl is supplied in the form of a fresh salt brine. Sodium bicarbonate precipitated by this carbonation is separated from the mother liquor and the separated sodium bicarbonate, or part of it, is supplied dissolved in hot water to the initial decomposition. Carbon dioxide with associated ammonia recovered in the recovery still of the ammonia-soda process prior to the addition of lime is advantageously supplied to this carbonation, together with any additional carbon dioxide required. The mother liquor from which the sodium bicarbonate is separated is supplied to the recovery still. This operation is illustrated in the flow diagram constituting Figure 1 of the accompanying drawings. By the operation above described all of the $Na_2CO_3$ left in the mother liquor remaining after precipitation of the sodium carbonate monohydrate becomes precipitated as $NaHCO_3$ in the carbonation operation in the ammonia-soda process, with the result that the overall yield of sodium carbonate monohydrate from NaCl is at least as large as the usual yield of $NaHCO_3$ from NaCl in the regular ammonia-soda process.

The separated sodium carbonate monohydrate may be dried in any conventional manner. If anhydrous dense sodium carbonate is the ultimate product desired, this drying may be carried out at a temperature somewhat above 100° C., the sodium carbonate monohydrate thus being dehydrated to sodium carbonate while retaining the pseudomorphic form of the original sodium carbonate monohydrate crystals.

*Operation 2*

Figure 2:
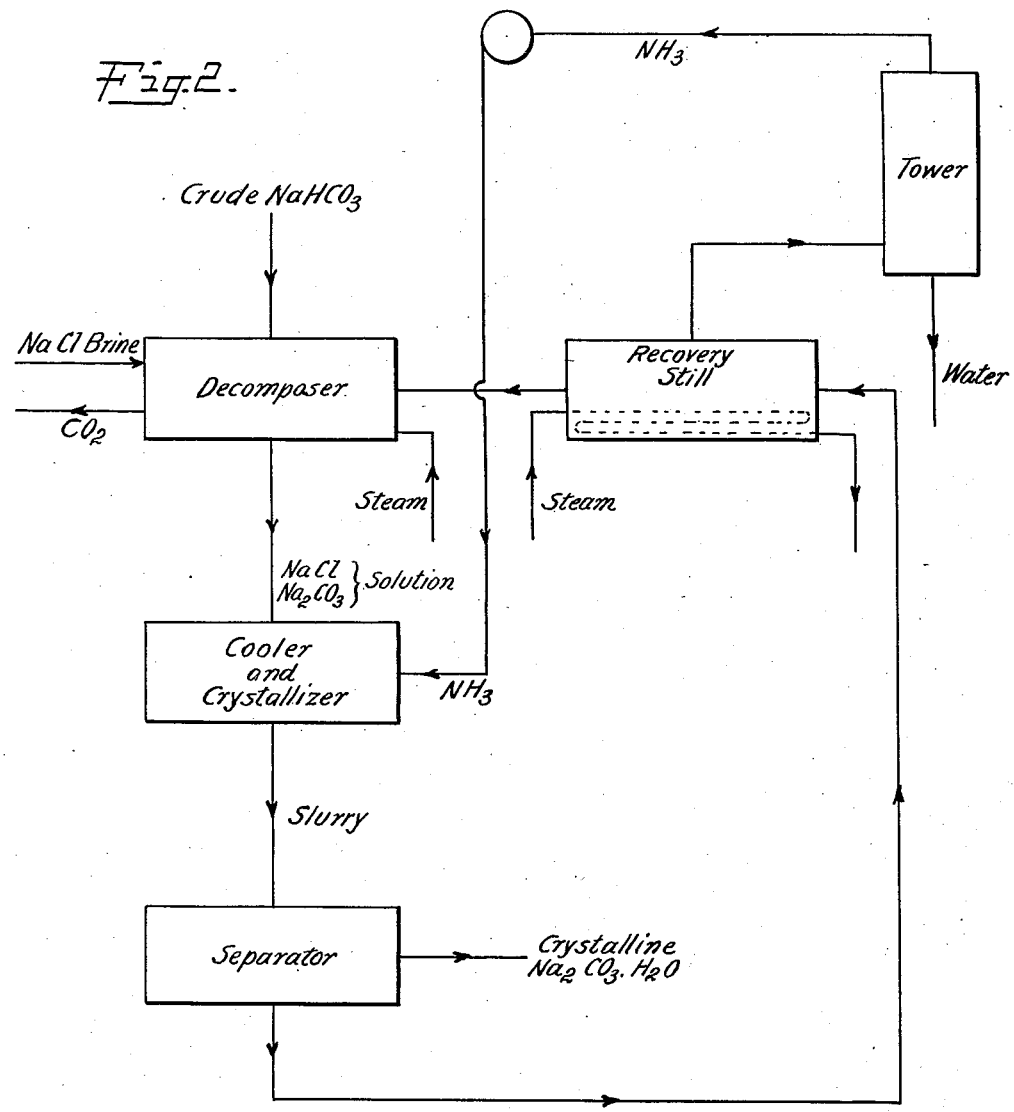

Crude ammonia soda is dissolved in an aqueous sodium chloride solution of sodium carbonate circulated cyclicly in the operation to produce a slurry which is decomposed with steam in the conventional manner until 85-90% or more of the sodium oxide present is in the form of sodium carbonate. The carbon dioxide and any ammonia recovered in the decomposition operation are supplied, for example, to the ammonia soda process for the production of sodium bicarbonate. The aqueous sodium chloride solution containing sodium carbonate resulting from the above decomposition is cooled to 50° C., for example, and ammonia gas is added to precipitate sodium carbonate monohydrate. The mother liquor from which the sodium carbonate monohydrate is separated is returned to the initial decomposition either directly or after an operation for the recovery of ammonia from this mother liquor. If this mother liquor is returned directly to the initial decomposition, ammonia as well as carbon dioxide will be recovered in the decomposition operation. Substantially pure carbon dioxide can be recovered in the decomposition operation, however, if this mother liquor is first stripped of its ammonia content in a recovery still, for example. The mother liquor may be supplied from this recovery still to the decomposition operation while hot. This recovery still is advantageously heated indirectly by closed steam coils, for example. The ammonia recovered in this still is advantageously used in the precipitation of sodium carbonate monohydrate from the aqueous sodium chloride solution containing sodium carbonate resulting from the decomposition operation. To maintain the system in balance, water may be separated from the mother liquor in this recovery still and thereafter separated from the recovered ammonia in any conventional manner in a fractionating tower, for example, and discharged from the system. This operation is illustrated in the flow diagram constituting Figure 2 of the accompanying drawings.

I claim:

1. In the manufacture of sodium carbonate monohydrate, the improvement which comprises decomposing an aqueous solution containing sodium chloride and sodium bicarbonate with steam to form an aqueous sodium chloride solution containing sodium carbonate, and precipitating sodium carbonate monohydrate from this solution by the addition of ammonia in proportion less than that precipitating sodium carbamate.

2. In the manufacture of sodium carbonate monohydrate, the improvement which comprises decomposing an aqueous sodium chloride solution containing sodium bicarbonate with steam to form an aqueous sodium chloride solution containing sodium carbonate, precipitating sodium carbonate monohydrate from this solution by the addition of ammonia and separating the precipitated sodium carbonate monohydrate from the mother liquor, carbonating the mother liquor to precipitate sodium bicarbonate, separating the precipitated sodium bicarbonate and supplying sodium bicarbonate so precipitated to the first-mentioned decomposition.

3. In the manufacture of sodium carbonate monohydrate, the improvement which comprises decomposing an aqueous sodium chloride solution containing sodium bicarbonate with steam to form an aqueous sodium chloride solution containing sodium carbonate, precipitating sodium carbonate monohydrate from this solution by the addition of ammonia and separating the precipitated sodium carbonate monohydrate from the mother liquor, adding sodium chloride to the mother liquor and carbonating the mother liquor containing added sodium chloride to precipitate sodium bicarbonate, separating the precipitated sodium bicarbonate and supplying sodium bicarbonate so precipitated to the first-mentioned decomposition.

4. In the manufacture of sodium carbonate monohydrate, the improvement which comprises decomposing an aqueous sodium chloride solution containing sodium bicarbonate with steam to form an aqueous sodium chloride solution containing sodium carbonate, precipitating sodium carbonate monohydrate from this solution by the addition of ammonia and separating the precipitated sodium carbonate monohydrate from the mother liquor, adding sodium chloride to the mother liquor and carbonating the mother liquor containing added sodium chloride to precipitate sodium bicarbonate, separating the precipitated sodium bicarbonate, supplying sodium bicarbonate so recipitated to the first-mentioned decomposition, recovering carbon dioxide and ammonia from the mother liquor from which sodium bicarbonate is so separated, supplying carbon dioxide so recovered to the said carbonation and supplying ammonia so recovered to the said precipitation of sodium carbonate monohydrate.

5. In the manufacture of sodium carbonate monohydrate, the improvement which comprises decomposing an aqueous solution containing sodium bicarbonate and sodium chloride with steam to form a solution containing sodium carbonate, precipitating sodium carbonate monohydrate from this solution by the addition of ammonia and separating the precipitated sodium carbonate monohydrate from the mother liquor, recovering ammonia from the mother liquor and supplying ammonia so recovered to the said precipitation of sodium carbonate monohydrate.

6. The method of producing sodium carbonate monohydrate which comprises forming an aqueous solution containing sodium chloride and sodium bicarbonate, heating the solution to decompose the sodium bicarbonate contained therein, subsequently subjecting the solution to the action of ammonia to precipitate sodium carbonate monohydrate, and separating the precipitated sodium carbonate monohydrate from the residual solution.

7. The method of producing sodium carbonate monohydrate which comprises forming an aqueous solution containing sodium chloride and sodium bicarbonate, heating the solution in a reaction vessel to decompose the sodium bicarbonate contained therein, subsequently subjecting the solution to the action of ammonia to precipitate sodium carbonate monohydrate, separating the precipitated sodium carbonate monohydrate from the residual solution, and returning the residual solution to said reaction vessel.

8. The method of producing sodium carbonate monohydrate which comprises incorporating sodium bicarbonate in an aqueous solution of sodium chloride to form an aqueous solution containing sodium bicarbonate and sodium chloride, heating the solution in a reaction vessel to decompose the sodium bicarbonate contained therein, subsequently subjecting the solution to the action of ammonia to precipitate sodium carbonate monohydrate, separating the precipitated sodium carbonate monohydrate from the residual sodium chloride-bearing solution, stripping ammonia from the residual solution, and returning the stripped residual solution to said reaction vessel.

9. The method of producing sodium carbonate monohydrate which comprises forming an aqueous solution containing sodium chloride and sodium bicarbonate, heating the solution in a reaction vessel to decompose the sodium bicarbonate contained therein, subsequently subjecting the solution to the action of ammonia to precipitate sodium carbonate monohydrate, separating the precipitated sodium carbonate monohydrate from the residual solution, adding sodium chloride to the residual solution and carbonating this solution to precipitate sodium bicarbonate, separating the precipitated sodium bicarbonate and returning it to said reaction vessel, recovering carbon dioxide and ammonia from the solution from which this sodium bicarbonate is separated, supplying this carbon dioxide to said carbonation and supplying this ammonia to the said precipitation of sodium carbonate monohydrate.

10. In the manufacture of sodium carbonate monohydrate, the improvement which comprises decomposing an aqueous solution containing sodium bicarbonate and sodium chloride with steam in a reaction vessel to form a solution containing sodium carbonate, precipitating sodium carbonate monohydrate from this solution by the addition of ammonia, separating the precipitated sodium carbonate monohydrate from the mother liquor and returning the mother liquor to said reaction vessel.

11. In the manufacture of sodium carbonate monohydrate, the improvement which comprises decomposing an aqueous solution containing sodium carbonate and sodium chloride with steam in a reaction vessel to form a solution containing sodium carbonate, precipitating the sodium carbonate monohydrate from this solution by the addition of ammonia, separating the precipitated sodium carbonate monohydrate from the mother liquor, recovering ammonia from the mother liquor, and returning the mother liquor from which ammonia has been recovered to said reaction vessel.

ROBERT BURNS MacMULLIN.